United States Patent
Cai et al.

(10) Patent No.: US 11,946,799 B2
(45) Date of Patent: Apr. 2, 2024

(54) DISTRIBUTED FIBER-OPTIC ACOUSTIC SENSING SYSTEM AND SIGNAL PROCESSING METHOD USING THE SAME

(71) Applicant: Shanghai Institute of Optics And Fine Mechanics, Chinese Academy of Sciences, Shanghai (CN)

(72) Inventors: Haiwen Cai, Shanghai (CN); Bin Lu, Shanghai (CN); Zhaoyong Wang, Shanghai (CN); Lei Ye, Shanghai (CN); Qing Ye, Shanghai (CN); Ronghui Qu, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 383 days.

(21) Appl. No.: 17/340,529

(22) Filed: Jun. 7, 2021

(65) Prior Publication Data

US 2021/0293612 A1 Sep. 23, 2021

Related U.S. Application Data

(63) Continuation of application No. PCT/CN2020/092792, filed on May 28, 2020.

(30) Foreign Application Priority Data

Jan. 21, 2020 (CN) .......................... 202010068189.3

(51) Int. Cl.
*G01H 9/00* (2006.01)
*G01D 5/353* (2006.01)

(52) U.S. Cl.
CPC ......... *G01H 9/004* (2013.01); *G01D 5/35383* (2013.01)

(58) Field of Classification Search
None
See application file for complete search history.

(56) References Cited

U.S. PATENT DOCUMENTS

| 11,111,780 B2* | 9/2021 | Barfoot .............. G01M 5/0025 |
| 2008/0114254 A1* | 5/2008 | Matcovitch ......... G01S 15/8968 |
| | | 600/463 |

(Continued)

FOREIGN PATENT DOCUMENTS

| CN | 102244362 A | 11/2011 |
| CN | 106043168 A | 10/2016 |

(Continued)

OTHER PUBLICATIONS

Yang Yang, "Research on Key Technology of Distributed Fiber-optic Hydrophone System," Dissertation, Hunan University (May 2018).

(Continued)

*Primary Examiner* — Jerry Rahll
(74) *Attorney, Agent, or Firm* — Mei & Mark LLP; Manni Li (57) ABSTRACT

A distributed fiber-optic acoustic sensing system and a signal processing method. The distributed fiber-optic acoustic sensing system is based on a high spatial resolution distributed fiber-optic acoustic sensor. The interval between adjacent sensing units is centimeter or millimeter level. Through specific digital signal processing, signal enhancement can be realized, noise in the system and environment are suppressed, at the same time, problems such as interference fading is solved, and the sensor signal-to-noise ratio of subunits can be increased by two to three orders of magnitude. Each subunit can serve as an independent high-sensitivity sensor for sensing. The multiple subunits can form one or more new sensor arrays. The azimuth estimation and (Continued)

spatial orientation of signal sources can be realized by the array signal processing method.

10 Claims, 3 Drawing Sheets

(56) References Cited

U.S. PATENT DOCUMENTS

| | | | |
|---|---|---|---|
| 2012/0060615 A1* | 3/2012 | Farhadiroushan | G01V 1/40 356/73.1 |
| 2012/0230628 A1 | 9/2012 | Hill et al. | |
| 2012/0278043 A1* | 11/2012 | Lewis | G01D 5/35396 702/189 |
| 2013/0333476 A1* | 12/2013 | Omichi | G01H 9/004 73/655 |
| 2014/0188103 A1* | 7/2014 | Millett | A61B 18/1492 607/113 |
| 2019/0353029 A1* | 11/2019 | Barfoot | G01M 5/0025 |

FOREIGN PATENT DOCUMENTS

| | | |
|---|---|---|
| CN | 106525092 A | 3/2017 |
| CN | 108168686 A | 6/2018 |
| CN | 108286992 A | 7/2018 |
| CN | 108507663 A | 9/2018 |
| CN | 110261313 A | 9/2019 |
| CN | 110319917 A | 10/2019 |
| CN | 110375841 A | 10/2019 |
| CN | 110411553 A | 11/2019 |
| CN | 110470376 A | 11/2019 |
| CN | 110501062 A | 11/2019 |
| WO | WO 2019/166809 A1 | 9/2019 |

OTHER PUBLICATIONS

Pan Zhengqing, et al., "Phase-sensitive OTDR system based on digital coherent detection," Asia Communications & Photonics Conference & Exhibition, IEEE (Nov. 2011).

Zhou, Jun, et al., "Characteristics and Explanations of Interference Fading of a φ-OTDR With a Multi-Frequency Source," Journal of Lightwave Technology, vol. 31, No. 17, pp. 2947-2954 (Sep. 2013).

Dian Chen et al., "Phase-detection distributed fiber-optic vibration sensor without fading-noise based on time-gated digital OFDR," Optics Express, vol. 25, No. 7, pp. 1-11 (Apr. 2017).

Dian Chen et al., "High-fidelity distributed fiber-optic acoustic sensor with fading noise suppressed and sub-meter spatial resolution," Optics Express, vol. 26, No. 13, pp. 1-9 (Jun. 2018).

Liang, Jiajing, et al., "Distributed acoustic sensing for 2D and 3D acoustic source localization," Optics Letters, vol. 44, No. 7, pp. 1690-1693 (Apr. 2019).

* cited by examiner

DISTRIBUTED FIBER-OPTIC ACOUSTIC SENSING SYSTEM AND SIGNAL PROCESSING METHOD USING THE SAME

CROSS-REFERENCE TO RELATED APPLICATIONS

The subject application is a continuation of PCT/CN2020/092792 filed on May 28, 2020, which claims priority on Chinese Application No. CN202010068189.3 filed on Jan. 21, 2020, in China. The contents and subject matter of the PCT international application and Chinese priority application are incorporated herein by reference.

TECHNICAL FIELD

The present invention relates to signal source detection, particularly, a distributed fiber-optic acoustic sensing system and signal processing method using the same.

BACKGROUND ART

As a novel sensing technology, a distributed fiber-optic acoustic sensor has the advantages of anti-electromagnetic interference, corrosion resistance, small volume, and low cost. Compared with traditional point sensors, the distributed fiber-optic acoustic sensor also has the advantages of long detection distance, continuous distributed detection, no complicated networking, and high spatial resolution. The detection range of the distributed fiber-optic acoustic sensor can reach tens of kilometers, one optical fiber is equivalent to tens of thousands of sensors, and therefore, the distributed fiber-optic acoustic sensor has the unique advantages for dense vibration/sound wave detection under a large spatial scale. In recent years, the distributed fiber-optic acoustic sensor is widely used in oil and gas pipeline safety monitoring, railway safety monitoring, border security, and other fields.

Most of the current distributed fiber-optic acoustic sensing technologies are based on the Rayleigh scattering effect in the optical fiber. However, due to the weak amplitudes of scattered signals, the sensitivity and signal-to-noise ratio of the current distributed fiber-optic acoustic sensing technologies are limited. The minimum measurable phase of the current distributed acoustic sensor is about m rad/√Hz order of magnitude, and the sensitivity index of the current distributed acoustic sensor is much worse than the conventional sensitivity index u rad/√Hz of a fiber-optic hydrophone. See Yang Yang, "Research on Key Technology of Distributed Fiber-optic Hydrophone System," Dissertation, Hunan University, May 2018. There is still a gap between the current distributed acoustic sensor and a traditional point or interferometer sensor, and the distributed acoustic sensor cannot meet the needs of applications such as weak sound signal detection. Therefore, the application fields of the distributed acoustic sensor are limited, and it is urgent to improve the sensitivity and signal-to-noise ratio of fiber-optic sensing systems. In addition, due to the random spatial distribution of the refractive index in the optical fiber, the signals scattered back may undergo interference fading, thus, the extremely low signal amplitude is caused, the signals under test cannot be normally demodulated, and the reliability of the sensing system is affected. The problem of interference fading is also one of the key problems to be solved by the distributed fiber-optic acoustic sensing technology.

Pan Z., et al., "Phase-sensitive OTDR system based on digital coherent detection," Asia Communications & Photonics Conference & Exhibition, IEEE (2012) discloses a digital coherent demodulation-based phase-sensitive optical time domain reflectometer quantitative measurement system and a demodulation formula of amplitude and phase information, but fails to solve the problem of interference fading, nor further uses the spatial correlation between quantitative sound field signals to enhance sound field signals or realize the orientation and positioning of the signal sources.

Zhou, Jun, et al., "Characteristics and Explanations of Interference Fading of a Φ-OTDR With a Multi-Frequency Source," Journal of Lightwave Technology, (2013) discloses a method based on multi-frequency comprehensive judgment, which can effectively solve the problem of interference fading but fails to solve the problems of signal-to-noise ratio and sensitivity, nor further uses the spatial correlation between the quantitative sound field signals to enhance the sound field signals or realize the orientation and positioning of the signal sources.

Dian Chen et al., "Phase-detection distributed fiber-optic vibration sensor without fading-noise based on time-gated digital OFDR," Optics Express (2017) and Dian Chen et al., "High-fidelity distributed fiber-optic acoustic sensor with fading noise suppressed and sub-meter spatial resolution," Optics Express (2018) disclose a time-keyed optical frequency-domain reflectometer. According to the time-keyed optical frequency-domain reflectometer, the problem of reflection fading can be solved through frequency division multiplexing and rotating vector summation and the signal-to-noise ratio and sensitivity of the sensor are improved. However, they are still limited, the minimum measurable phase is still m rad/√Hz, and the spatial correlation between the quantitative sound field signals is not further used to enhance the sound field signals or realize the orientation and positioning of signal sources.

Liang, Jiajing, et al., "Distributed acoustic sensing for 2D and 3D acoustic source localization," Optics Letters (2019) discloses a method of performing spatial orientation of signal sources by using the distributed fiber-optic acoustic sensing technology. However, due to the low signal-to-noise ratio and sensitivity of the distributed fiber-optic acoustic sensor, the needs of acoustic signal detection cannot be met. In the article, the length of the optical fiber is increased by densely winding the optical fiber to improve the sensitivity, and preliminary results are obtained. However, the method sacrifices the sensing distance and weakens the advantages of the distributed fiber-optic sensor, therefore, the practicability of the method is greatly reduced, and it is difficult to truly apply in engineering practice. At the same time, due to the limited spatial resolution of the distributed fiber-optic acoustic sensor, when the sound field signals are enhanced, after a certain number of sensing units are selected and combined, the signal-to-noise ratio and sensitivity are improved but the spatial resolution ability of the sensor is lost. For example, if 100 sensing units with an interval of 10 m are selected and combined into one sensing unit, the synthesized sensing unit has too large aperture and can only serve as an independent sensor for signal detection, and the formation of a high-sensitivity distributed sensor array cannot be further realized. Therefore, the technology cannot effectively combine long-distance distributed signal enhancement and space orientation of signal sources and has not really solved the problems of signal-to-noise ratio and sensitivity of the distributed fiber-optic acoustic sensor and spatial azimuth estimation and orientation of distributed signal sources at the same time.

SUMMARY OF THE INVENTION

The present invention overcomes shortcomings of the current technology and solves the problem of limited signalto-noise ratio and sensitivity of distributed fiber-optic acoustic sensing technologies, at the same time, the spatial resolution ability of the present invention is not sacrificed and sensing units with enhanced sensitivity can be used for forming an array without the need for changing the structure of a sensing optical fiber to realize the azimuth estimation and space orientation of signal sources. The present invention is simple to implement and can solve the problems of interference fading and limited sensitivity of distributed fiber-optic sensors. The anti-interference ability of a sensing system working in complex environments can be effectively improved. The present invention is of great significance to application fields that require continuous long-distance and distributed dynamic detection at the same time such as marine underwater acoustic detection, oil and gas exploration, and railway monitoring.

To achieve the above objectives, the present invention provides a distributed fiber-optic acoustic sensing system which comprises a distributed fiber-optic acoustic sensor and a sensing optical fiber, wherein the distributed fiber-optic acoustic sensor is connected to the sensing optical fiber, and is used for emitting a detection light pulse to the sensing optical fiber, collecting and demodulating the sound fields of the signal sources sensed along the sensing optical fiber; the total number of sensing units in the axial direction of the distributed fiber-optic acoustic sensor is L, the sensing units are divided into M subunits in the axial direction, and the number of the sensing units in each subunit is N, and L=M×N is met, and the sensing units in each subunit are used for spatially coherent combination of sound field signals obtained by detection; and the spatial resolution of the distributed fiber-optic acoustic sensor is centimeter-level or higher.

Preferably, the spatial resolution of the distributed fiber-optic acoustic sensor in the present invention is 1 mm-1 cm.

In the present invention, the distributed fiber-optic acoustic sensor comprises a distributed fiber-optic sensor based on a sweep frequency pulse and a pulse compression technology, an optical frequency domain reflectometer, and one or more of phase-sensitive optical time-domain reflectometers based on an ultra-narrow pulse or coherent detection.

In the present invention, the signal sources comprise one or more of objects that vibrate in the air, soil, or water to produce sound waves.

Preferably, the subunits serve as independent high-sensitivity sensors for sensing.

Preferably, M, subunits which are adjacent or at regular intervals can also be selected from the M subunits to serve as a new sensor array; and the newly formed sensing array performs demodulation of the sound fields of the signal sources by a directional array signal processing method.

In the present invention, the number M of the subunits is greater than or equal to 10 and is less than or equal to 10,000.

In the present invention, the number N of the sensing units is greater than or equal to 10 and is less than or equal to 10,000.

In the present invention, the spatial scale of the subunits is meter or sub-meter level.

Preferably, the spatial scale of the subunits is 0.1-10 m.

The present invention further provides a signal processing method of the distributed fiber-optic acoustic sensing system. The method comprises the steps of:

Step (1) distributed sound field signal collection: distributed sound field signals collected by the distributed fiber-optic acoustic sensor are s(l,t), wherein l represents one-dimensional axial space of the sensing optical fiber, and t represents time;

Step (2) division of the subunits: the total number of the sensing units in the axial direction of the distributed fiber-optic acoustic sensor is L, the sensing units are divided into M subunits in the axial direction, and the number of the sensing units in each subunit is N, and L=M×N is met, wherein the sound field signals collected by the N sensing units in the mth subunits are:

$[S_m(l_0+(m-1)\cdot N\cdot \Delta z,t), S_m(l_0+(m-1)\cdot N\cdot \Delta z+\Delta z,t), K$
$S_m(l_0+(m-1)\cdot N\cdot \Delta z+(N-1)\Delta z,t)],$ which is abbreviated as $[S_{m,1}, S_{m,2}, K\ S_{m,N}]$; m is greater than or equal to 1 and less than or equal to M; $l_0$ represents the starting position of the optical fiber; $\Delta z$ represents the distance between the two adjacent sensing units; and the minimum value of $\Delta z$ is determined by the spatial resolution of the distributed fiber-optic acoustic sensor;

Step (3) spatially coherent combination in the subunits, and realization of signal-to-noise ratio and sensitivity enhancement: the sound field signals $[S_m(l_0+(m-1)\cdot N\cdot \Delta z,t), S_m(l_0+(m-1)\cdot N\cdot \Delta z+\Delta z,t), K\ S_m(l_0+(m-1)\cdot N\cdot \Delta z+(N-1)\Delta z,t)]$ collected by the N sensing units in the mth subunit are enhanced by a spatially coherent combination algorithm to generate a signal $S_m(l_0+(m-1)\cdot N\cdot \Delta z+\Delta z,t)$, which is abbreviated as $S_m$; and after the M subunits are enhanced by array signal processing, obtained new sound field signals are $[S'_1, S'_2, K\ S'_m, K\ S'_M]$; and Step (4) realization of azimuth estimation and space orientation by the subunits serving as the independent high-sensitivity signal-to-noise ratio sensors or a new array formed by the subunits: each subunit can serve as the independent high-sensitivity sensor for sensing, and at the same time, $M_x$ subunits which are adjacent or at regular intervals can also be selected from the M subunits to serve as the new sensor array; the M subunits can form one or more sensor arrays; the newly formed sensor array performs the azimuth estimation or space orientation of the signal sources by a directional array signal processing method; and the process similar to the step (3) can also be repeated again to achieve signal enhancement.

In the present invention, the spatially coherent combination in the step (3) comprises a vector superposition or beamforming array signal processing method.

In the present invention, the array signal processing method performing azimuth estimation or space orientation in the step (4) comprises one of a conventional beamforming algorithm, a spatial spectrum estimation algorithm and a direction-of-arrival estimation algorithm.

Preferably, the vector superposition method is used for linearly superimposing sound field vectors obtained by each sensing unit in the subunits.

Preferably, the beamforming array signal processing method comprises the steps of:

firstly, calculating the time delay vector of the signal source with respect to each sensing unit in the subunit according to the spatial position information of each sensing unit in each subunit, for example, the time delay vector of the signal source with respect to each sensing unit in the mth subunit is $a_p(\Delta \tau) = [\Delta \tau_{m,1}\ \Delta \tau_{m,2}\ L\ \Delta \tau_{m,N}]$ or the phase retardation is $a_p(\Delta \varphi) = [\Delta \varphi_{m,1}\ \Delta \varphi_{m,2}\ L\ \Delta \varphi_{m,N}],$ wherein p=1,2,L,P, P represents the number of the signal source;

and then, performing signal processing on a sampled signal group and a delay vector obtained in each subunit in the step (3) by using the array signal processing method, wherein the sound field signals [$S_m$ ($l_0$+(m−1)·N·Δz,t), $S_m$($l_0$+(m−1)·N·Δz+Δz,t), K $S_m$($l_0$+ (m−1)·N·Δz+(N−1)Δz,t)] collected by the N sensing units in the mth subunit are enhanced by array signal processing to generate a signal $S'_m$($l_0$+(m−1)·N·Δz+Δz, t), which is abbreviated as $S'_m$, and after the M subunits are enhanced by array signal processing, obtained new sound field signals are [$S'_1$,$S'_2$,K $S'_m$,K $S'_M$].

In the present invention, the spatial position information of each sensing unit in each subunit is the position vector of the signal source with respect to each sensing unit in the subunit or the three-dimensional position coordinates of the signal source relative to each sensing unit in the subunit; and the spatial position information is obtained by using a signal source space orientation method or specified artificially based on existing knowledge.

In the present invention, the array signal processing method implemented in the step (3) is a self-adaptive spatial filtering method and/or a delay-and-sum method.

Preferably, the self-adaptive spatial filtering method is one of a method adopting a minimum variance distortionless response beamformer (MVDR), a method adopting a linearly constrained minimum variance beamformer (LCMV), and a method adopting a generalized sidelobe canceling beamformer (GSC).

Preferably, the delay-and-sum method comprises the steps of calculating delay compensation weight $W_p(\Delta\tau)$= [−Δ$\tau_{m,1}$−Δ$\tau_{m,2}$ L−Δ$\tau_{m,N}$] according to the time delay vector $a_p(\Delta\tau)$=[Δ$\tau_{m,1}$ Δ$\tau_{m,2}$ L Δ$\tau_{m,N}$] of the signal source with respect to each sensing unit in the mth subunit; and obtaining an enhanced signal of the pth signal source by calculating according to the following mode:

$$S'_m = W_p \cdot [S_{m,1}, S_{m,2} K S_{m,N}]^T,$$

wherein T represents transposition operation, other P−1 signal sources and environmental noise can be suppressed, and the signal suppression effect of the P−1 signal sources is limited by the number of the sensing units in the entire subunit. After the sound field signals collected by the N sensing units in the mth subunit are enhanced by the above-mentioned array signal processing, the environmental noise can be effectively suppressed, the noise floor of the sensing system is reduced, the signal-to-noise ratio and sensitivity of the sensing system are improved, and at the same time, the interference fading and other problems of the fiber-optic sensing system can be solved.

Preferably, the method of the present invention adopting the linearly constrained minimum variance beamformer (LCMV) comprises the steps of:

calculating the covariance matrix of the sampled signal group, $$R = \sum_{i=1}^{K} [S_{m,1}, S_{m,2}, K S_{m,N}]^T \cdot [S_{m,1}, S_{m,2}, K S_{m,N}]/K$$

wherein K represents the number of repeated measurements of the high spatial resolution distributed fiber-optic acoustic sensor, the restriction vector $F_{1 \times P}$=[0 0 L 1 L 0] of the pth signal source is determined, the Pth element of the restriction vector is 1, and the rest elements are 0, the restriction vector determines that only the Pth signal source is subjected to directional enhancement, while the other signal sources are subjected to directional suppression; and calculating the phase compensation weight according to the following equation, $$W_p(\varphi) = \frac{R^{-1}a_p}{a_p^H R^{-1} a_p} F^H$$

wherein H represents conjugate transposition, the enhanced signal of the pth signal source is obtained by calculating according to the following mode:

$$S'_m = W_p \cdot [S_{m,1}, S_{m,2}, K S_{m,N}]^T.$$

Preferably, the spatial spectrum estimation algorithm is as follows:

firstly, generating the sensor array performing spatial spectrum estimation by the step (4), wherein after $M_x$ subunits are enhanced, the new sound field signals are [$S'_m$,$S'_{m+1}$,K $S'_{m+M_x-1}$], and are distributed along the optical fiber;

secondly, setting up a coordinate system (x,y,z) in the three-dimensional space, and performing coordinate system conversion on [$S'_m$,$S'_{m+1}$,K $S'_{m+M_x-1}$] according to the specific sensing optical fiber laying method T[x,y,z], wherein $S'_m$($l_0$+(m−1)·N·Δz+Δz,t) is converted into $S'_m$($x_m$,$y_m$,$z_m$,t), which is abbreviated as $S''_m$, that is, [$S'_m$,$S'_{m+1}$,K $S'_{m+M_x-1}$] is converted into [$S''_m$, $S''_{m+1}$,K $S''_{m+M_x-1}$] after being subjected to coordinate conversion;

thirdly, calculating the covariance matrix of the above sound field signals;

$$R'' = \sum_{i=1}^{K} [S''_{m+1}, S''_{m+2}, K S''_{m+M_x}]^T \cdot [S''_{m+1}, S''_{m+2}, K S''_{m+M_x}]/K,$$

wherein K is the number of repeated measurements of the high spatial resolution distributed fiber-optic acoustic sensor;

fourthly, performing eigenvalue decomposition on the covariance matrix R" to obtain noise subspace $E_n$, and calculating signal subspace $E_s(\theta_i,r_i)$ corresponding to the sensor array by the sensing optical fiber laying method, wherein $\theta_i$ represents the azimuth of the ith signal source, and $r_i$ represents the linear distance from the ith signal source to the central position of the sensor array; and calculating the loss function according to the following relationship, $$\Gamma(\theta, r) = \frac{1}{[E_s(\theta, r)E_n]^H E_n} E_s(\theta, r),$$

wherein H represents conjugate transposition, the orientation vector ($\theta_i$,$r_i$) of the signal source with respect to the sensor array is obtained by searching the maximum value of the loss function and calculating; and fifthly, calculating the two-dimensional space coordinates of the ith signal source according to the following relationship, $$x_i = r_i \sin \theta_i, y_i = r_i \cos \theta_i.$$

Preferably, when the two sensor arrays are generated in the step (4) in the method of the present invention, the beamforming algorithm is as follows:

firstly, generating the two sensor arrays according to the step (4) in the method of the present invention, wherein after the two sensor arrays are enhanced, the sound field signals are $[S'_m, S'_{m+1}, K\ S'_{m+M_x-1}]$ and $[S'_{m+l}, S'_{m+l+1}, K\ S'_{m+l+M_x-1}]$, the interval between the two sensor arrays is l, and the sound field signals are distributed along the optical fiber;

secondly, setting up a coordinate system (x,y,z) in the three-dimensional space, and performing coordinate system conversion on the sound field signals of the two sensor arrays by the specific sensing optical fiber laying method T[x,y,z] to obtain $[S''_m, S''_{m+1}, K\ S''_{m+M_x-1}]$ and $[S''_{m+l}, S''_{m+l+1}, K\ S''_{m+l+M_x-1}]$;

thirdly, calculating the covariance matrix of the above sound field signals, $$R''_1 = \sum_{i=1}^{K} [S''_{m+1}, S''_{m+2}, K\ S''_{m+M_x}]^T \cdot [S''_{m+1}, S''_{m+2}, K\ S''_{m+M_x}]/K$$

$$R''_2 = \sum_{i=1}^{K} [S''_{m+l+1}, S''_{m+l+2}, K\ S''_{m+l+M_x}]^T \cdot [S''_{m+l+1}, S''_{m+l+2}, K\ S''_{m+l+M_x}]/K,$$

K represents the number of repeated measurements of the distributed fiber-optic acoustic sensor;

fourthly, respectively calculating the phase delay vector $A^1(\theta_i^1, \varphi_i^1)$ corresponding to the first sensor array and the phase delay vector $A^2(\theta_i^2, \varphi_i^2)$ corresponding to the second sensor array by the sensing optical fiber laying method T[x,y,z], wherein $\theta_i^1$ and $\theta_i^2$ respectively represents the azimuth of the ith signal source and the first sensor array and the azimuth of the ith signal source and the second sensor array, and $\varphi_i^1$ and $\varphi_i^2$ respectively represents the pitch angle of the ith signal source and the first sensor array and the pitch angle of the ith signal source and the second sensor array; calculating the spatial energy distribution function $D(\theta,\varphi)$ of the signal source according to the following equation:

$$D(\theta_i^1, \varphi_i^1) = A^1(\theta_i^1, \varphi_i^1)^H R''_1 A^1(\theta_i^1, \varphi_i^1)$$

$$D(\theta_i^2, \varphi_i^2) = A^2(\theta_i^2, \varphi_i^2)^H R''_2 A^2(\theta_i^2, \varphi_i^2),$$

wherein the position vector $(\theta_i^1, \varphi_i^1)$ of the ith signal source and the first sensor array and the position vector $(\theta_i^2, \varphi_i^2)$ of the ith signal source and the second sensor array are obtained by searching the maximum value of the space energy distribution function $D(\theta,\varphi)$ and calculating; and fifthly, obtaining the three-dimensional space coordinates of the ith disturbance source by calculating direction vectors corresponding to a first signal group and a second signal group according to the following formula:

$$x_i = y_i \tan\theta_i^1,\ y_i = \frac{l}{|\tan\theta_i^1 - \tan\theta_i^2|},\ z_i = \frac{y}{\cos\theta_i^1 \tan\varphi_i^1}.$$

The optical fiber laying method T[x,y,z] comprises one of a two-dimensional space laying method and a three-dimensional space laying method.

Preferably, the two-dimensional space laying method comprises one of a dual-parallel optical fiber laying structure and an S-like bent optical fiber laying structure.

Preferably, the three-dimensional space laying method adopts a double-layer double-parallel optical fiber laying structure.

The distributed fiber-optic acoustic sensing system of the present invention has the characteristics and advantages that:

1. the distributed fiber-optic acoustic sensing system is based on the high spatial resolution distributed fiber-optic acoustic sensor, and the spatial resolution of the high spatial resolution distributed fiber-optic acoustic sensor is centimeter or millimeter level, which ensures that the number of the sensing units is larger under a certain spatial scale;

2. according to the distributed fiber-optic acoustic sensing system, the sensing units are divided into a lot of subunits in the axial direction; each subunit comprises thousands or hundreds of sensing units; the sound field signals detected by the numerous sensing units in each subunit are combined into one new sound field signal to be output, so that signal enhancement is realized, noise in the sensor and the environment can be effectively suppressed, meanwhile problems such as interference fading are solved, the signal-to-noise ratio and sensitivity of the sensing system are greatly improved, the sensing sensitivity of the subunits can be improved by two to three orders of magnitude, and the problem of limited sensitivity of the distributed fiber-optic sensor due to weak scattered signals is solved;

3. the sensitivity of the subunits subjected to signal enhancement is two to three orders of magnitude higher than that of a distributed fiber-optic acoustic wave sensor; the subunits subjected to signal enhancement can serve as the independent high-sensitivity sensors; the spatial size of the subunit is still only meter or sub-meter level; and the subunits can form a new high sensitivity sensor array, and realize azimuth estimation and space orientation of the signal sources without changing the structure of the sensing optical fiber.

BRIEF DESCRIPTION OF THE DRAWINGS

FIGS. 2A to 2D show the signal processing method of the present invention, where

DETAILED DESCRIPTION OF THE INVENTION

The present invention is described in detail in connection with the figures and the following embodiments, however, they do not serve to limit the scope of the present invention.

One of skill in the art may modify or change the present invention as shown in the embodiments without departing from the scope of the present invention.

Embodiment I

Figure 1:
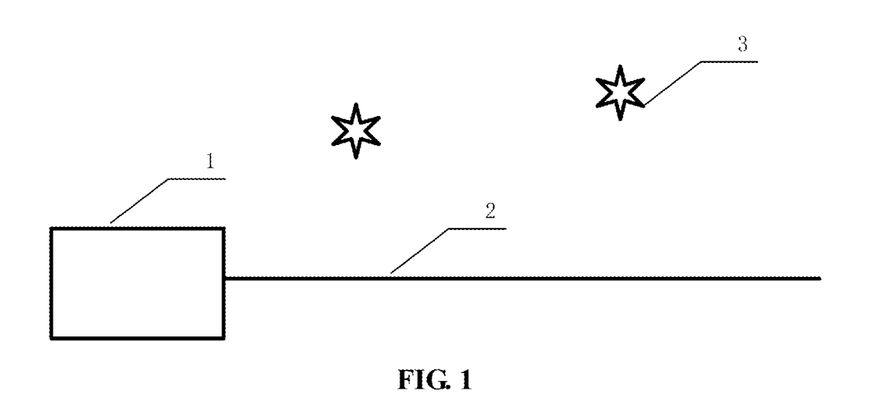
FIG. 1 shows the basic structure of the distributed fiber-optic acoustic sensing system of the present invention.

In the first embodiment of the present invention as shown in FIG. 1, the distributed fiber-optic acoustic sensing system comprises a high spatial resolution distributed fiber-optic acoustic sensor 1 and a sensing optical fiber 2. The total number of sensing units in the axial direction of the distributed fiber-optic acoustic sensor is L. The sensing units are divided into M subunits in the axial direction, and the number of the sensing units in each subunit is N, and the condition that L=M×N is met. The distributed fiber-optic acoustic sensor is connected to the sensing optical fiber and is used for emitting a detection light pulse to the sensing optical fiber, collecting and demodulating the sound fields of signal sources 3 sensed along the sensing optical fiber. The distributed fiber-optic acoustic sensor is based on a sweep frequency pulse and a pulse compression technology.

Figure 3:
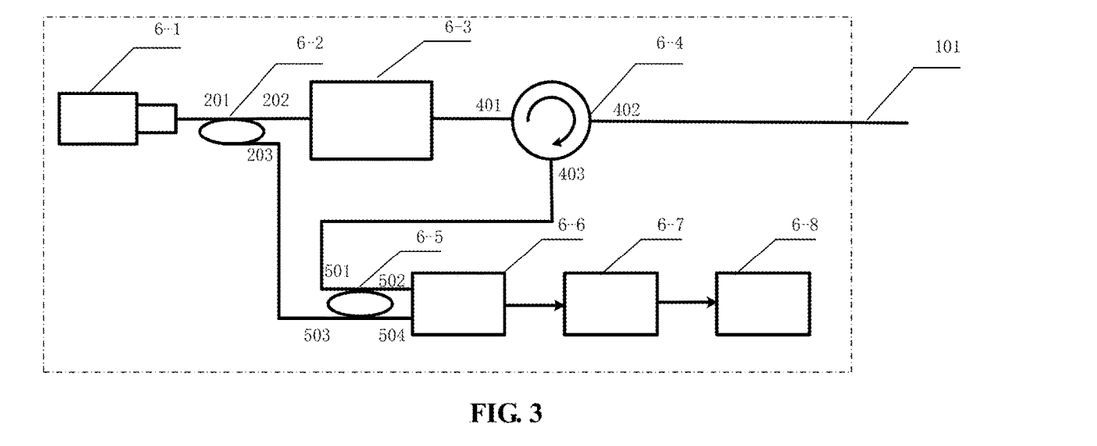
FIG. 3 shows the distributed fiber-optic sensor based on a sweep frequency pulse and a pulse compression technology of the present invention.

As shown in FIG. 3, the range of the sweep frequency pulse is 10 GHz, the spatial resolution is 1 cm, and the sensing optical fiber is a SM-28 ordinary single-mode optical fiber/cable. The distributed fiber-optic acoustic sensor based on the sweep frequency pulse and the pulse compression technology comprises a single-frequency narrow linewidth laser 6-1, a first fiber-optic coupler 6-2, a linear frequency-modulation pulse modulation module 6-3, a circulator 6-4, a sensing optical fiber interface 101, a second fiber-optic coupler 6-5, a partial polarization coherent detection unit 6-6, a data acquisition unit 6-7, and a digital signal processing unit 6-8. Single-frequency narrow linewidth laser light output by the single-frequency narrow linewidth laser 6-1 is output to a second port 202 and a third port 203 of the first fiber-optic coupler 6-2 through a first port 201 of the first fiber-optic coupler 6-2. The second port 202 of the first fiber-optic coupler 6-2 is connected to the linear frequency-modulation pulse modulation module 6-3; the linear frequency-modulation pulse modulation module 6-3 is used for modulating continuous light into a linear frequency modulation light pulse and is connected to a first port 401 of the circulator 6-4. A second port 402 of the circulator 6-4 is connected to the sensing optical fiber interface 101. A third port 403 of the circulator 6-4 and the third port 203 of the first fiber-optic coupler 6-2 are respectively connected to a first port 501 and a third port 503 of the second fiber-optic coupler 6-5. A second port 502 and a fourth port 504 of the second fiber-optic coupler 6-5 are connected to an input port of the partial polarization coherent detection unit 6-6. An output port of the partial polarization coherent detection unit 6-6 is connected to an input port of the data acquisition unit 6-7. The data acquisition unit 6-7 is connected to the digital signal processing unit 6-8, and the digital signal processing unit 6-8 is used for realizing pulse compression processing, signal demodulation etc.

Figure 2A:
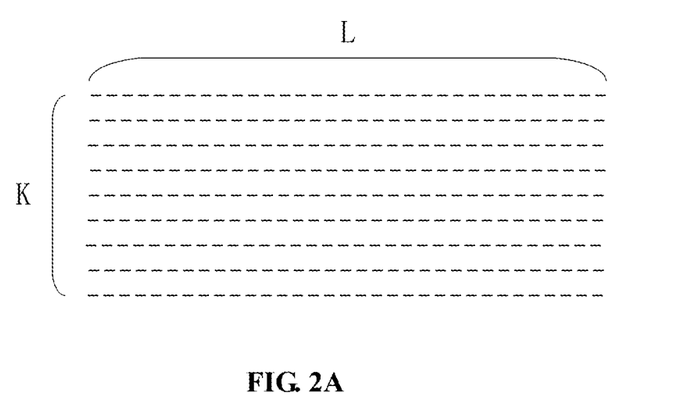
FIG. 2A shows distributed sound field signal acquisition.
Figure 2B:
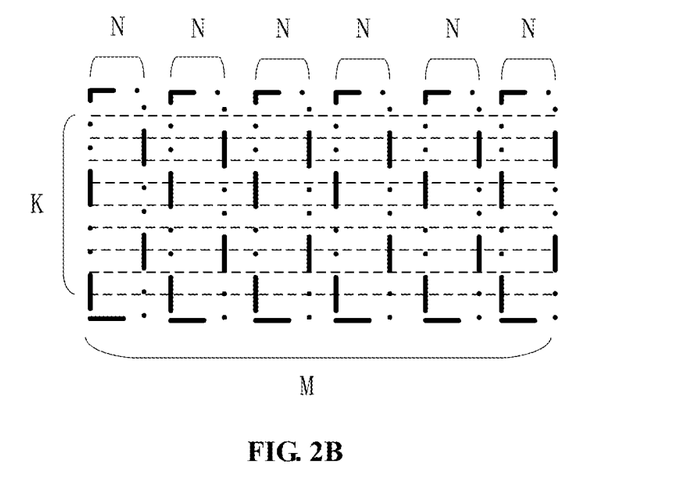
FIG. 2B shows division of subunits.
Figure 2C:
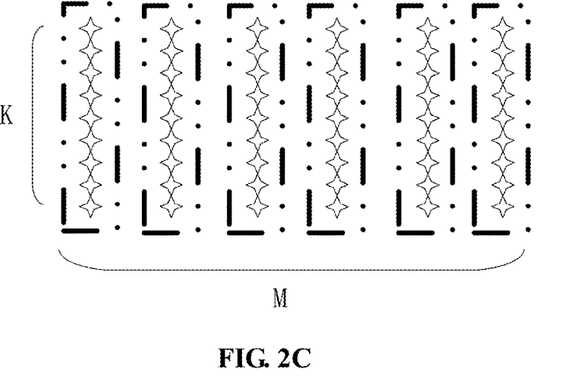
FIG. 2C shows spatial coherent combination in subunits and realization of signal-to-noise ratio and sensitivity enhancement.
Figure 2D:
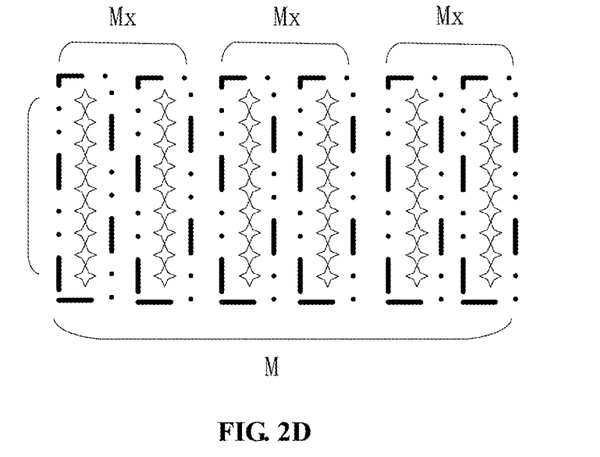
FIG. 2D shows realization of azimuth estimation and spatial orientation by subunits serving as independent high-sensitivity and high-signal-to-noise ratio sensors or a new array formed by the subunits.

The spatially coherent combination method in the present invention adopts a delay-and-sum beamforming algorithm. After the subunits are enhanced, the subunits serve as high-sensitivity distributed fiber-optic acoustic sensors and do not perform azimuth estimation and space orientation of signal sources; and the implementation steps are as follows as shown in FIGS. 2A to 2D:

step (1): as shown in FIG. 2A, the high spatial resolution distributed fiber-optic acoustic sensor is connected to the sensing optical fiber and is used for emitting the detection light pulse to the sensing optical fiber, collecting and quantitatively demodulating the sound fields of the signal sources sensed along the sensing optical fiber to obtain distributed sound field signals S(l,t) , wherein l represents one-dimensional axial space of the sensing optical fiber, and t represents time;

step (2): as shown in FIG. 2B, the total number of the sensing units in the axial direction of the high spatial resolution distributed fiber-optic acoustic sensor is L, the sensing units are divided into M subunits in the axial direction, the number of the sensing units in each subunit is N, and L=M×N is met, wherein the sound field signals collected by the N sensing units in the mth subunit are: $[S_m(l_0+(m-1)\cdot N\cdot\Delta z,t), S_m(l_0+(m-1)\cdot N\cdot\Delta z+\Delta z,t), K\ S_m(l_0+(m-1)\cdot N\cdot\Delta z+(N-1)\Delta z,t)]$, which is abbreviated as $[S_{m,1}, S_{m,2}, K\ S_{m,N}]$; m is greater than or equal to 1 and less than or equal to M; $l_0$ represents the starting position of the optical fiber; $\Delta z$ represents the distance between the two adjacent sensing units; the minimum value of $\Delta z$ is determined by the spatial resolution of the distributed fiber-optic acoustic sensor; the spatial resolution of the distributed fiber-optic acoustic sensor is centimeter level or higher; N is about tens or hundreds; and the spatial scale of each subunit is meter or submeter level;

step (3): calculating the time delay vector of the signal source with respect to each sensing unit in the subunit according to the spatial position information of each sensing unit in each subunit, for example, the time delay vector of the signal source with respect to each sensing unit in the mth subunit is $a_p(\Delta\tau)=[\Delta\tau_{m,1}\ \Delta\tau_{m,2}\ L\ \Delta\tau_{m,N}]$, or the phase retardation is $a_p(\Delta\varphi)=[\Delta\varphi_{m,1}\ \Delta\varphi_{m,2}\ L\ \Delta\varphi_{m,N}]$, wherein p=1,2,L,P, P represents the number of signal sources;

step (4): calculating delay compensation weight $W_p(\Delta\tau)=[-\Delta\tau_{m,1}\ -\Delta\tau_{m,2}\ L-\Delta\tau_{m,N}]$ according to the time delay vector $a_p(\Delta\tau)=[\Delta\tau_{m,1}\ \Delta\tau_{m,2}\ L\ \Delta\tau_{m,N}]$ of the signal source with respect to each sensing unit in the mth subunit;

obtaining an enhanced signal of the pth signal source by calculating according to the following mode: $S'_m = W_p \cdot [S_{m,1}, S_{m,2} K\ S_{m,N}]^T$, wherein T represents transposition operation, other P−1 signal sources and environmental noise can be suppressed, and the signal suppression effect of the P−1 signal sources is limited by the number of the sensing units in the entire subunit. After the sound field signals collected by the N sensing units in the mth subunit are enhanced by the above-mentioned array signal processing, the environmental noise can be effectively suppressed, the noise floor of the sensing system is reduced, the signal-to-noise ratio and sensitivity of the sensing system are improved, and at the same time, the interference fading and other problems of the fiber-optic sensing system can be solved. Wherein, the sound field signals $[S_m(l_0+(m-1)\cdot N\cdot\Delta z,t), S_m(l_0+(m-1)\cdot N\cdot\Delta z+\Delta z,t), K\ S_m(l_0+(m-1)\cdot N\cdot\Delta z+(N-1)\Delta z,t)]$ collected by the N sensing units in the mth subunit are enhanced by array signal processing to generate a signal $S'_m(l_0+(m-1)\cdot N\cdot\Delta z+\Delta z,t)$, which is abbreviated as $S'_m$; and after the M subunits are enhanced by array signal processing, obtained new sound field signals are $[S'_1, S'_2, K\ S'_m, K\ S'_M]$, which is shown in FIG. 2C; and step (5): as shown in FIG. 2D, each subunit can serve as an independent high-sensitivity sensor for sensing, and the process similar to the steps (3) and (4) can also be repeated again as needed to further realize signal enhancement.

Embodiment II

Figure 4:
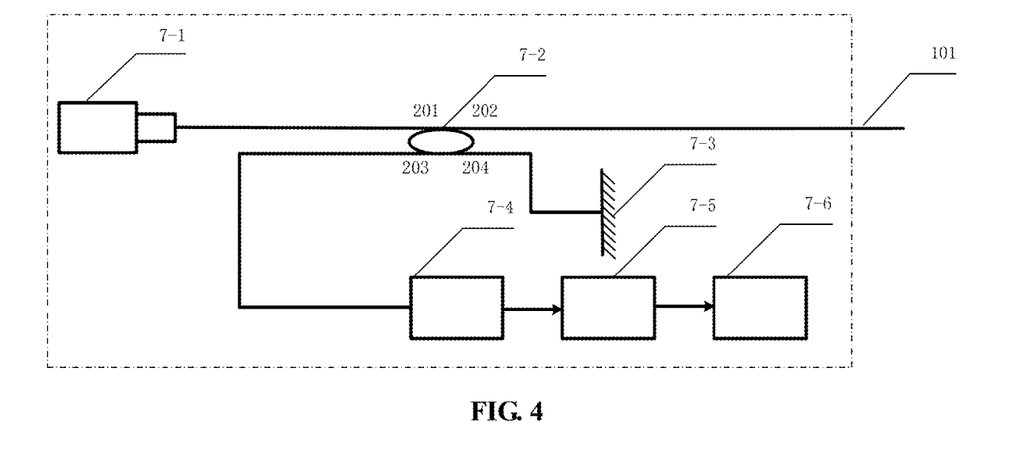
FIG. 4 shows the optical frequency domain reflectometer with a Michelson interferometer structure in the present invention.

In the second embodiment of the present invention, the distributed fiber-optic acoustic sensor adopts an optical frequency domain reflectometer with a Michelson interferometer structure. As shown in FIG. 4, the sweep frequency range of a linear sweep frequency laser is 100 GHz, the spatial resolution of the sensor is about 1 mm, and the sensing optical fiber is a SM-28 ordinary single-mode optical fiber/cable. The optical frequency domain reflectometer is of the Michelson interferometer structure and comprises a frequency tunable laser 7-1, a fiber-optic coupler 7-2, an optical fiber reflecting end face 7-3, a photodetector 7-4, a data acquisition unit 7-5, a digital signal processing unit 7-6, and a sensing optical fiber interface 101. The frequency tunable laser 7-1 is used for outputting linear frequency modulation laser light which is output to a second port 202 and a fourth port 204 of the fiber-optic coupler 7-2 through a first port 201 of the fiber-optic coupler 7-2; the fourth port 204 of the fiber-optic coupler 7-2 is connected to the optical fiber reflecting end face 7-3; the second port 202 of the fiber-optic coupler 7-2 is connected to the sensing optical fiber interface 101; a third port 203 of the fiber-optic coupler 7-2 is connected to the photodetector 7-4; a signal output by the photodetector 7-4 is connected to the data acquisition unit 7-5; and the data acquisition unit 7-5 is connected to the digital signal processing unit 7-6.

The spatially coherent combination method of the present invention adopts the delay-and-sum beamforming algorithm; after the subunits are enhanced, a new array is formed by the subunits and is used for performing the two-dimensional spatial spectrum estimation of the signal sources. The implementation steps are as follows:

step (1): the high spatial resolution distributed fiber-optic acoustic sensor is connected to the sensing optical fiber, and is used for emitting the detection light pulse to the sensing optical fiber, collecting and quantitatively demodulating the sound fields of the signal sources sensed along the sensing optical fiber to obtain distributed sound field signals $S(l,t)$, wherein l represents one-dimensional axial space of the sensing optical fiber, and t represents time;

step (2): the total number of the sensing units in the axial direction of the high spatial resolution distributed fiber-optic acoustic sensor is L, the sensing units are divided into M subunits in the axial direction, the number of the sensing units in each subunit is N, and $L=M\times N$ is met, wherein the sound field signals collected by the N sensing units in the mth subunit are:

$$[S_m(l_0+(m-1)\cdot N\cdot \Delta z,t), S_m(l_0+(m-1)\cdot N\cdot \Delta z+\Delta z,t), K\ S_m(l_0+(m-1)\cdot N\cdot \Delta z+(N-1)\Delta z,t)],$$

which is abbreviated as $[S_{m,1}, S_{m,2}, K\ S_{m,N}]$; m is greater than or equal to 1 and less than or equal to M; $l_0$ represents the starting position of the optical fiber; $\Delta z$ represents the distance between the two adjacent sensing units; the minimum value of $\Delta z$ is determined by the spatial resolution of the distributed fiber-optic acoustic sensor; the spatial resolution of the distributed fiber-optic acoustic sensor is centimeter level or higher; N is about tens or hundreds; and the spatial scale of each subunit is meter or submeter level;

step (3): calculating the time delay vector of the signal source with respect to each sensing unit in the subunit according to the spatial position information of each sensing unit in each subunit, for example, the time delay vector of the signal source with respect to each sensing unit in the mth subunit is $a_p(\Delta \tau)=[\Delta \tau_{m,1}\ \Delta \tau_{m,2}\ L\ \Delta \tau_{m,N}]$, or the phase retardation is $a_p(\Delta \varphi)=[\Delta \varphi_{m,1}\ \Delta \varphi_{m,2}\ L\ \Delta \varphi_{m,N}]$, wherein p=1,2,L,P, P represents the number of signal source;

step (4): calculating delay compensation weight $W_p(\Delta \tau)=[-\Delta \tau_{m,1}-\Delta \tau_{m,2}\ L-\Delta \tau_{m,N}]$ according to the time delay vector $a_p(\Delta \tau)=[\Delta \tau_{m,1}\ \Delta \tau_{m,2}\ L\ \Delta \tau_{m,N}]$ of the signal source with respect to each sensing unit in the mth subunit;

obtaining the enhanced signal of the pth signal source by calculating according to the following mode: $S'_m=W_p\cdot [S_{m,1},S_{m,2},K\ S_{m,N}]^T$, wherein T represents transposition operation, other P−1 signal sources and environmental noise can be suppressed, and the signal suppression effect of the P−1 signal sources is limited by the number of the sensing units in the entire subunit. After the sound field signals collected by the N sensing units in the mth subunit are enhanced by the above-mentioned array signal processing, the environmental noise can be effectively suppressed, the noise floor of the sensing system is reduced, the signal-to-noise ratio and sensitivity of the sensing system are improved, and at the same time, the interference fading and other problems of the fiber-optic sensing system can be solved. Wherein the sound field signals $[S_m(l_0+(m-1)\cdot N\cdot \Delta z,t), S_m(l_0+(m-1)\cdot N\cdot \Delta z+\Delta z,t), K\ S_m(l_0+(m-1)\cdot N\cdot \Delta z+(N-1)\Delta z,t)]$ collected by the N sensing units in the mth subunit are enhanced by array signal processing to generate a signal $S'_m(l_0+(m-1)\cdot N\cdot \Delta z+\Delta z,t)$, which is abbreviated as $S'_m$; and after the M subunits are enhanced by array signal processing, the obtained new sound field signals are $[S'_1,S'_2,K\ S'_m,K\ S'_M]$; and step (5): the main steps of two-dimensional space spectrum estimation are as follows:

firstly, selecting new sound field signals $[S'_m,S'_{m+1},K\ S'_{m+M_x-1}]$ after the $M_x$ subunits are enhanced from the new sound field signals generated in the step (4), wherein the new sound field signals are distributed along the optical fiber;

secondly, setting up a coordinate system (x,y,z) in the three-dimensional space, and performing coordinate system conversion on $[S'_m,S'_{m+1},K\ S'_{m+M_x-1}]$ according to the specific sensing optical fiber laying method $T[x,y,z]$, wherein $S'_m(l_0+(m-1)\cdot N\cdot \Delta z+\Delta z,t)$ is converted into $S'_m(x_m,y_m,z_m,t)$, which is abbreviated as $S'_m$, that is, $[S'_m,S'_{m+1},K\ S'_{m+M_x-1}]$ is converted into $[S''_m, S''_{m+1},K\ S''_{m+M_x-1}]$ after being subjected to coordinate conversion;

thirdly, calculating the covariance matrix of the above sound field signals;

$$R'' = \sum_{i=1}^{K}[S''_{m+1},\ S''_{m+2},K\ S''_{m+M_x}]^T \cdot [S''_{m+1}, S''_{m+2},\ K\ S''_{m+M_x}]/K,$$

K is the number of repeated measurements of the high spatial resolution distributed fiber-optic acoustic sensor;

fourthly, performing eigenvalue decomposition on the covariance matrix R'' to obtain noise subspace $E_n$, and calculating signal subspace $E_s(\theta_i,r_i)$ corresponding to the sensor array by the sensing optical fiber laying method, wherein $\theta_i$ represents the azimuth of the ith signal source, and $r_i$ represents the linear distance from the ith signal source to the central position of the sensor array; and calculating the loss function according to the following relationship:

$$\Gamma(\theta, r) = \frac{1}{[E_s(\theta, r)E_n]}{}^H E_n E_s H(\theta, r),$$

wherein H represents conjugate transposition, and the orientation vector $(\theta_i, r_i)$ of the signal source with respect to the sensor array is obtained by searching the maximum value of the loss function and calculating; and fifthly, calculating the two-dimensional space coordinates of the ith signal source according to the following relationship: $x_i = r_i \sin \theta_i$, $y_i = r_i \cos \theta_i$.

Embodiment III

Figure 5:
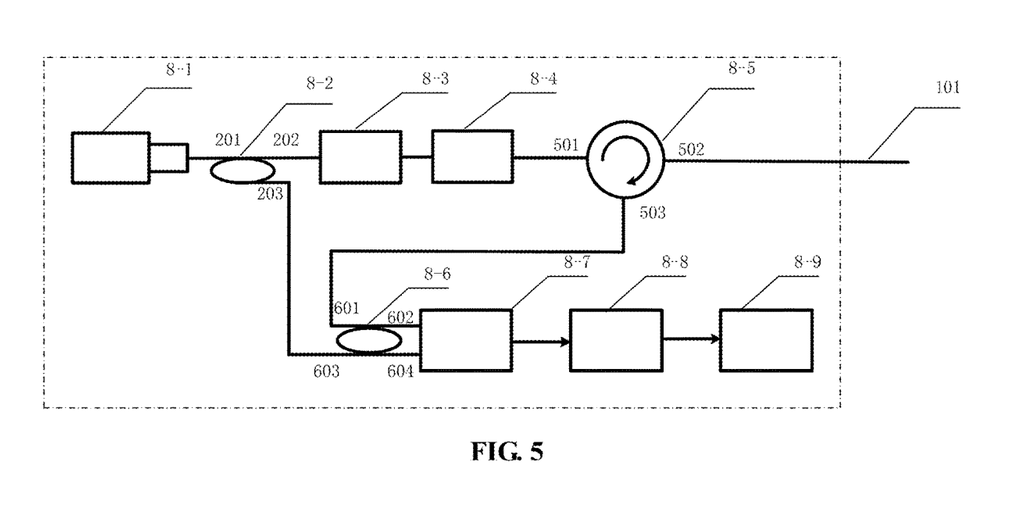
FIG. 5 shows the phase-sensitive optical time domain reflectometer based on an ultra-narrow pulse and coherent detection in the present invention

In the third embodiment of the present invention, the distributed fiber-optic acoustic sensor adopts a phase-sensitive optical time domain reflectometer based on an ultra-narrow pulse and coherent detection, and as shown in FIG. 5, the sensing optical fiber is a SM-28 ordinary single-mode optical fiber/cable. The phase-sensitive optical time domain reflectometer based on the ultra-narrow pulse and coherent detection comprises a single-frequency narrow linewidth laser 8-1, a first fiber-optic coupler 8-2, a second fiber-optic coupler 8-6, an ultra-narrow pulse modulator 8-3, an optical amplifier 8-4, a fiber-optic circulator 8-5, a double-balanced photodetector 8-7, a data acquisition unit 8-8, a digital signal processing unit 8-9, and a sensing optical fiber interface 101, wherein laser light of the single-frequency narrow linewidth laser 8-1 is input to a first port 201 of the first fiber-optic coupler 8-2, and then is connected to the ultra-narrow pulse modulator 8-3 and a third port 603 of the second fiber-optic coupler 8-6 through a second port 202 and a third port 203 of the first fiber-optic coupler 8-2; the output of the ultra-narrow pulse modulator 8-3 is connected to the optical amplifier 8-4; the output of the optical amplifier 8-4 is connected to a first port 501 of the fiber-optic circulator 8-5, is output by a second port 502 and is connected to the sensing optical fiber interface 101; a third port 503 of the fiber-optic circulator 8-5 is connected to a first port 601 of the second fiber-optic coupler 8-6; an output signal of the second fiber-optic coupler 8-6 is output and connected to the double-balanced photodetector 8-7 through a second port 602 and a fourth port 604; and an output signal of the double-balanced photodetector 8-7 is connected to the data acquisition unit 8-8 to be amplified, and then is input to a digital signal processing unit 12-8.

The spatially coherent combination method of the present invention adopts a delay-and-sum beamforming algorithm; and after the subunits are enhanced, the subunits serve as the high sensitivity distributed fiber-optic sensors and do not perform the azimuth estimation and the spatial orientation of the signal sources. The implementation steps are as follows:

step (1): the high spatial resolution distributed fiber-optic acoustic sensor is connected to the sensing optical fiber, and is used for emitting the detection light pulse to the sensing optical fiber, collecting and quantitatively demodulating the sound fields of the signal sources sensed along the sensing optical fiber to obtain distributed sound field signals S(l,t), wherein l represents one-dimensional axial space of the sensing optical fiber, and t represents time;

step (2): the total number of the sensing units in the axial direction of the high spatial resolution distributed fiber-optic acoustic sensor is L, the sensing units are divided into M subunits in the axial direction, the number of the sensing units in each subunit is N, and L=M×N is met, wherein the sound field signals collected by the N sensing units in the mth subunit are:

$$[S_m(l_0+(m-1)\cdot N\cdot\Delta z,t), S_m(l_0+(m-1)\cdot N\cdot\Delta z+\Delta z,t), K$$
$$S_m(l_0+(m-1)\cdot N\cdot\Delta z+(N-1)\Delta z,t)],$$

which is abbreviated as $[S_{m,1}, S_{m,2}, K\ S_{m,N}]$; m is greater than or equal to 1 and less than or equal to M; $l_0$ represents the starting position of the optical fiber; $\Delta z$ represents the distance between the two adjacent sensing units; the minimum value of $\Delta z$ is determined by the spatial resolution of the distributed fiber-optic acoustic sensor; the spatial resolution of the distributed fiber-optic acoustic sensor is centimeter level or higher; N is about tens or hundreds; and the spatial scale of each subunit is meter or submeter level;

step (3): calculating the time delay vector of the signal source with respect to each sensing unit in the subunit according to the spatial position information of each sensing unit in each subunit, for example, the time delay vector of the signal source with respect to each sensing unit in the mth subunit is $a_p(\Delta\tau)=[\Delta\tau_{m,1}\ \Delta\tau_{m,2}\ L\ \Delta\tau_{m,N}]$, or the phase retardation is $a_p(\Delta\varphi)=[\Delta\varphi_{m,1}\ \Delta\varphi_{m,2}\ L\ \Delta\varphi_{m,N}]$, wherein p=1,2,L,P, P represents the number of the signal source;

step (4): calculating delay compensation weight $W_p(\Delta\tau)=[-\Delta\tau_{m,1} -\Delta\tau_{m,2}\ L -\Delta\tau_{m,N}]$ according to the time delay vector $a_p(\Delta\tau)=[\Delta\tau_{m,1}\ \Delta\tau_{m,2}\ L\ \Delta\tau_{m,N}]$ of the signal source with respect to each sensing unit in the mth subunit; obtaining the enhanced signal of the pth signal source by calculating according to the following mode: $S'_m = W_p \cdot [S_{m,1}, S_{m,2} K\ S_{m,N}]^T$, wherein T represents transposition operation, other P–1 signal sources and environmental noise can be suppressed, and the signal suppression effect of the P–1 signal sources is limited by the number of the sensing units in the entire subunit. After the sound field signals collected by the N sensing units in the mth subunit are enhanced by the above-mentioned array signal processing, the environmental noise can be effectively suppressed, the noise floor of the sensing system is reduced, the signal-to-noise ratio and sensitivity of the sensing system are improved, and at the same time, the interference fading and other problems of the fiber-optic sensing system can be solved, wherein the sound field signals $[S_m(l_0+(m-1)\cdot N\cdot\Delta z,t), S_m(l_0+(m-1)\cdot N\cdot\Delta z+\Delta z,t), K\ S_m(l_0+(m-1)\cdot N\cdot\Delta z+(N-1)\Delta z,t)]$ collected by the N sensing units in the mth subunit are enhanced by array signal processing to generate a signal $S'_m(l_0+(m-1)\cdot N\cdot\Delta z+\Delta z,t)$, which is abbreviated as $S'_m$; and after the M subunits are enhanced by array signal processing, obtained new sound field signals are $[S'_1, S'_2, K\ S'_m, K\ S'_M]$; and step (5): each subunit can serve as the independent high-sensitivity sensor for sensing, and the process similar to the steps (3) and (4) can also be repeated again as needed to further realize signal enhancement.

The present invention is simple to implement, and can solve the problems of interference fading and limited signal-to-noise ratio of the distributed fiber-optic sensor; according to the present invention, a high signal-to-noise ratio sensor array can be constructed without changing the optical fiber structure, and the azimuth estimation and spatial orientation of the signal sources are realized; and the present invention is of great significance to the fields such as marine underwater acoustic detection and oil and gas exploration.

Although the present invention is described in detail with reference to the above-mentioned specific embodiments, it shall be understood that the present invention is not limited to the disclosed embodiments and examples, and for those skilled in the art, various changes can be made to the form and details of the present invention. For example, the working waveband of the laser can be replaced with other wavebands, and the circulator can be replaced with the coupler. It shall be understood that the above are only specific embodiments of the present invention and are not used to limit the present invention, and any modification, equivalent replacement, improvement, etc. made within the spirit and principle of the present invention shall be comprised in the protection scope of the present invention.

We claim:

1. A distributed fiber-optic acoustic sensing system, comprising
a distributed fiber-optic acoustic sensor comprising a plurality of sensing units along an axial direction, wherein the distributed fiber-optic acoustic sensor comprises
a distributed fiber-optic sensor based on a sweep frequency pulse and a pulse compression technology,
an optical frequency domain reflectometer, and
one or more of phase-sensitive optical time-domain reflectometers based on an ultra-narrow pulse or coherent detection, and
a sensing optical fiber,
wherein the distributed fiber-optic acoustic sensor is connected to the sensing optical fiber and is used for emitting a detection light pulse to the sensing optical fiber, collecting and demodulating sound fields of signal sources sensed along the sensing optical fiber;
a total number of the sensing units in the axial direction of the distributed fiber-optic acoustic sensor is L, the sensing units are divided into M subunits in the axial direction, and the number of the sensing units in each subunit is N, L=M×N, and the sensing units in each subunit are used for spatially coherent combination of sound field signals obtained by detection; and
spatial resolution of the distributed fiber-optic acoustic sensor is centimeter-level or higher.

2. The distributed fiber-optic acoustic sensing system according to claim 1, wherein the signal sources comprise one or more of objects that vibrate in the air, soil, or water to produce sound waves.

3. The distributed fiber-optic acoustic sensing system according to claim 1, wherein the number M of the subunits $10 \leq M \leq 10,000$.

4. The distributed fiber-optic acoustic sensing system according to claim 1, wherein the number N of the sensing units in each subunit is $10 \leq N \leq 10,000$.

5. The distributed fiber-optic acoustic sensing system according to claim 1, wherein the spatial scale of the subunits is meter or sub-meter level.

6. A signal processing method using the distributed fiber-optic acoustic sensing system as described in claim 1, comprising
step (1) collecting distributed sound field signal, wherein the distributed sound field signals collected by the distributed fiber-optic acoustic sensor are $s(l,t)$, $l$ represents one-dimensional axial space of the sensing optical fiber and $t$ represents time;
step (2) dividing the subunits, wherein the total number of the sensing units in the axial direction of the distributed fiber-optic acoustic sensor is L, the sensing units are divided into M subunits in the axial direction, and the number of the sensing units in each subunit is N, and L=M×N is met, the sound field signals collected by the N sensing units in the mth subunit are:
$[S_m(l_0+(m-1)\cdot N\cdot \Delta z,t), S_m(l_0+(m-1)\cdot N\cdot \Delta z+\Delta z,t), K\ S_m(l_0+(m-1)\cdot N\cdot \Delta z+(N-1)\Delta z,t)]$ that is abbreviated as $[S_{m,1}, S_{m,2}, \ldots, S_{m,N}]$; m meets $1 \leq m \leq M$; $l_0$ represents a starting position of the optical fiber; $\Delta z$ represents the distance between the two adjacent sensing units; and the minimum value of $\Delta z$ is determined by the spatial resolution of the distributed fiber-optic acoustic sensor;
step (3) conducting spatially coherent combination in the subunits and realizing signal-to-noise ratio and sensitivity enhancement, wherein the sound field signals $[S_m(l_0+(m-1)\cdot N\cdot \Delta z,t), S_m(l_0+(m-1)\cdot N\cdot \Delta z+\Delta z,t), K\ S_m(l_0+(m-1)\cdot N\cdot \Delta z+(N-1)\Delta z,t)]$ collected by the N sensing units in the mth subunit are enhanced by a spatially coherent combination algorithm to generate a signal $S_m(l_0+(m-1)\cdot N\cdot \Delta z+\Delta z,t)$ that is abbreviated as $S'_m$; and after the M subunits are enhanced by array signal processing, obtained new sound field signals are $[S'_1, S'_2, \ldots, S'_m, \ldots, S'_M]$; and
step (4) realizing azimuth estimation and space orientation by the subunits serving as independent high-sensitivity signal-to-noise ratio sensors or a new array formed by the subunits, wherein each subunit can serve as the independent high-sensitivity sensor for sensing, and at the same time, $M_x$ subunits which are adjacent or at regular intervals can also be selected from the M subunits to serve as the new sensor array; the M subunits can form one or more sensing arrays; the newly formed sensor array performs the azimuth estimation or space orientation of the signal sources by a directional array signal processing method; and the process similar to the step (3) can be repeated again to achieve signal enhancement.

7. The signal processing method according to claim 6, wherein the spatially coherent combination in the step (3) comprises a vector superposition or beamforming array signal processing method.

8. The signal processing method according to claim 6, wherein the array signal processing method performing azimuth estimation or space orientation in the step (4) comprises one of a conventional beamforming algorithm, a spatial spectrum estimation algorithm, or a direction-of-arrival estimation algorithm.

9. The signal processing method according to claim 6, wherein the array signal processing method implemented in the step (3) is a self-adaptive spatial filtering method, a delay-and-sum method, or both.

10. The signal processing method according to claim 9, wherein the self-adaptive spatial filtering method is a method adopting a minimum variance distortionless response beamformer (MVDR), a method adopting a linearly constrained minimum variance beamformer (LCMV), or a method adopting a generalized sidelobe cancellation beamformer (GSC).

* * * * *